United States Patent
Guo et al.

(10) Patent No.: US 11,537,206 B2
(45) Date of Patent: Dec. 27, 2022

(54) WEARABLE DEVICE, ELECTRONIC SYSTEM AND DEVICE, TACTILE FEEDBACK METHOD AND STORAGE MEDIUM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Ziqiang Guo, Beijing (CN); Jian Sun, Beijing (CN); Xinjian Liu, Beijing (CN); Yakun Wang, Beijing (CN); Lin Lin, Beijing (CN); Zhen Tang, Beijing (CN); Yu Lei, Beijing (CN); Minglei Chu, Beijing (CN); Jiankang Sun, Beijing (CN); Jinghua Miao, Beijing (CN); Guixin Yan, Beijing (CN); Feng Zi, Beijing (CN)

(73) Assignees: BEIJING BOE OPTOELECTRONICS TECHNOLOGY CO., LTD., Beijing (CN); Beijing BOE Technology Development Co., Ltd., Beijing (CN)

( * ) Notice: Subject to any disclaimer, the term of this patent is extended or adjusted under 35 U.S.C. 154(b) by 585 days.

(21) Appl. No.: 16/474,397

(22) PCT Filed: Nov. 20, 2018

(86) PCT No.: PCT/CN2018/116501
§ 371 (c)(1),
(2) Date: Jun. 27, 2019

(87) PCT Pub. No.: WO2019/200911
PCT Pub. Date: Oct. 24, 2019

(65) Prior Publication Data
US 2021/0333879 A1    Oct. 28, 2021

(30) Foreign Application Priority Data

Apr. 16, 2018    (CN) .......................... 201810339539.8

(51) Int. Cl.
*G06F 3/01*    (2006.01)
*H04W 4/80*    (2018.01)
(Continued)

(52) U.S. Cl.
CPC .............. *G06F 3/016* (2013.01); *G06F 3/014* (2013.01); *H01F 7/081* (2013.01); *H01F 7/18* (2013.01); *H04W 4/80* (2018.02)

(58) Field of Classification Search
CPC .......... G06F 3/016; G06F 3/014; H01F 7/081; H01F 7/18; H04W 4/80
See application file for complete search history.

(56) References Cited

U.S. PATENT DOCUMENTS

| 5,583,478 A | * | 12/1996 | Renzi | ...................... G06F 3/016 340/407.1 |
| 9,445,876 B2 | * | 9/2016 | Ingmanson | ............ A61B 42/00 |

(Continued)

FOREIGN PATENT DOCUMENTS

| CN | 201239951 Y |   | 5/2009 |
| CN | 103207673 A | * | 7/2013 |

(Continued)

OTHER PUBLICATIONS

Mithul Garg, Vince Maxwell, Ellie Quirini, Haptic Glove for VR, Oct. 4, 2016, 28 pages (Year: 2016).*

(Continued)

*Primary Examiner* — Yongjia Pan
(74) *Attorney, Agent, or Firm* — Collard & Roe, P.C.

(57) ABSTRACT

A wearable device, an electronic system, an electronic device, a tactile feedback method and a storage medium are (Continued)

provided. The wearable device with tactile feedback includes an electromagnetic coil set, a driving circuit and a control circuit, the driving circuit is coupled with the electromagnetic coil set; the control circuit is configured to control the driving circuit to generate and output a coil current corresponding to the electromagnetic coil set to the electromagnetic coil set according to a control command; and the electromagnetic coil set is configured to receive the coil current and generate the tactile feedback based on the coil current.

17 Claims, 6 Drawing Sheets

(51) Int. Cl.
*H01F 7/08* (2006.01)
*H01F 7/18* (2006.01)
*H01F 3/08* (2006.01)

(56) References Cited

U.S. PATENT DOCUMENTS

| | | | |
|---|---|---|---|
| 9,911,292 B1* | 3/2018 | Khoshkava | G09B 21/00 |
| 10,275,025 B2* | 4/2019 | Black | G06F 3/016 |
| 2014/0318699 A1* | 10/2014 | Longinotti-Buitoni | D06M 11/83 156/247 |
| 2016/0054798 A1* | 2/2016 | Messingher | G02B 27/017 345/156 |
| 2016/0054837 A1* | 2/2016 | Stafford | A63F 13/212 463/33 |
| 2016/0363997 A1* | 12/2016 | Black | G06F 3/014 |
| 2017/0042760 A1* | 2/2017 | Hamilton | A61N 1/322 |
| 2017/0061753 A1* | 3/2017 | Khoshkava | G06F 3/0488 |
| 2017/0097680 A1* | 4/2017 | Keller | G06F 3/016 |
| 2017/0131771 A1* | 5/2017 | Keller | G06F 3/016 |
| 2017/0131773 A1* | 5/2017 | Keller | G06F 3/017 |
| 2017/0131774 A1* | 5/2017 | Keller | G06F 3/011 |
| 2017/0165567 A1* | 6/2017 | Walters | G06F 3/016 |
| 2019/0201785 A1* | 7/2019 | Heubel | G06F 3/016 |

FOREIGN PATENT DOCUMENTS

| | | | | |
|---|---|---|---|---|
| CN | 104598033 A | 5/2015 | | |
| CN | 205318322 U | 6/2016 | | |
| CN | 106227346 A | 12/2016 | | |
| CN | 106708190 A | 5/2017 | | |
| CN | 106959755 A | 7/2017 | | |
| CN | 207100612 U | 3/2018 | | |
| CN | 108536300 A | 9/2018 | | |
| EP | 3 273 327 A1 | 1/2018 | | |
| EP | 3327547 A1 * | 5/2018 | | F16F 1/361 |
| EP | 3346370 B1 * | 7/2019 | | G06F 1/163 |
| KR | 20130101367 A * | 9/2013 | | |

OTHER PUBLICATIONS

Jonathan Blake; Hakan B. Gurocak, Haptic Glove With MR Brakes for Virtual Reality, Oct. 2009, 10 pages (Year: 2009).*
Building a Haptic Feedback Glove for Virtual Reality, Feb. 23, 2017, 8 pages (Year: 2017).*
International Search Report of PCT/CN2018/116501 in Chinese, dated Jan. 30, 2019, with English translation.
Notice of Transmittal of the International Search Report of PCT/CN2018/116501 in Chinese, dated Jan. 30, 2019.
Written Opinion of the International Searching Authority of PCT/CN2018/116501 in Chinese, dated Jan. 30, 2019 with English translation.
Chinese Office Action in Chinese Application No. 201810339539.8, dated Jul. 19, 2019 with English translation.

* cited by examiner

WEARABLE DEVICE, ELECTRONIC SYSTEM AND DEVICE, TACTILE FEEDBACK METHOD AND STORAGE MEDIUM

CROSS REFERENCE TO RELATED APPLICATIONS

This application is the National Stage of PCT/CN2018/116501 filed on Nov. 20, 2018, which claims priority under 35 U.S.C. § 119 of Chinese Application No. 201810339539.8 filed on Apr. 16, 2018, the disclosure of which is incorporated by reference.

TECHNICAL FIELD

Embodiments of the present disclosure relate to a wearable device, an electronic system, an electronic device, a tactile feedback method and a storage medium.

BACKGROUND

A wearable device is an emerging category in the field of consumer electronics. It is not only a hardware device, but also an intelligent device which can achieve various functions by means of software support, data interaction, cloud interaction and the like. With the development of technologies, the wearable device is applied more and more widely and relates to various fields and application scenarios.

In recent years, the virtual reality technology has been rapidly developed. The virtual reality technology is a computer simulation system which can create and experience a virtual world, and it utilizes a computer to generate a simulation environment and is a multi-source information fused and interactive system simulation of three-dimensional dynamic view and physical behavior, so as to enable a user to be immersed into this environment. When the wearable device is applied to the virtual reality technology, diversified functions can be provided, and user experience can be enriched.

SUMMARY

At least one embodiment of the present disclosure provides a wearable device with tactile feedback, wearable device with tactile feedback comprises an electromagnetic coil set, a driving circuit and a control circuit, the driving circuit is coupled with the electromagnetic coil set; the control circuit is configured to control the driving circuit to generate and output a coil current corresponding to the electromagnetic coil set to the electromagnetic coil set according to a control command; and the electromagnetic coil set is configured to receive the coil current and generate the tactile feedback based on the coil current.

For example, in the wearable device provided by some embodiments of the present disclosure, the electromagnetic coil set includes a plurality of electromagnetic coils, and the coil currents of the plurality of electromagnetic coils are different from each other.

For example, in the wearable device provided by some embodiments of the present disclosure, the coil currents of at least two electromagnetic coils in the plurality of electromagnetic coils are different in magnitude and direction; or the coil currents of the at least two electromagnetic coils are identical in magnitude and different in direction; or the coil currents of the at least two electromagnetic coils are identical in direction and different in magnitude.

For example, in the wearable device provided by some embodiments of the present disclosure, the electromagnetic coil set is configured to generate a plurality of magnetic fields under the action of the coil currents, the tactile feedback includes feedback of a repulsive force generated according to mutual repulsion of the plurality of magnetic fields, feedback of an attractive force generated according to mutual attraction of the plurality of magnetic fields, or feedback of combination of the repulsive force generated according to mutual repulsion of one portion of the plurality of magnetic fields and the attractive force generated according to mutual attraction of the other portion of the plurality of magnetic fields.

For example, in the wearable device provided by some embodiments of the present disclosure, the wearable device is a hand wearable device, the hand wearable device includes a plurality of finger regions corresponding to finger pulps of fingers of a hand and a palm region corresponding to a middle position of a palm of the hand, the electromagnetic coil set includes one electromagnetic coil, and the electromagnetic coil is positioned in one of the plurality of finger regions or the palm region; or, the electromagnetic coil set includes a plurality of electromagnetic coils, and the plurality of electromagnetic coils are respectively positioned in at least two of the plurality of finger regions, or the plurality of electromagnetic coils are respectively positioned in at least one of the plurality of finger regions and the palm region.

For example, in the wearable device provided by some embodiments of the present disclosure, the control command includes at least one of a direction and a current value of the coil current, increasing the current values of a portion or all of the coil currents, decreasing the current values of a portion or all of the coil currents, re-providing a portion or all of the coil currents and turning-off a portion or all of the coil currents.

For example, the wearable device provided by some embodiments of the present disclosure further comprises a power supply, the driving circuit and the control circuit are coupled with the power supply, and the power supply is configured to supply electric energy to the driving circuit and the control circuit.

For example, in the wearable device provided by some embodiments of the present disclosure, the power supply includes a flexible battery.

For example, in the wearable device provided by some embodiments of the present disclosure, the power supply and the driving circuit are integrated into one whole body.

For example, the wearable device provided by some embodiments of the present disclosure further comprises a first communication module, the first communication module is configured to communicate with a command device, receive the control command from the command device and send the control command to the control circuit.

At least one embodiment of the present disclosure provides an electronic system, the electronic system comprises a command device and the wearable device according to any one embodiment of the present disclosure, and the command device is configured to generate the control command and send the control command to the wearable device.

For example, in the electronic system provided by some embodiments of the present disclosure, the command device includes a second communication module, and the second communication module is configured to communicate with the wearable device.

For example, in the electronic system provided by some embodiments of the present disclosure, the wearable device includes a first communication module, and the second communication module is configured to communicate with the first communication module.

At least one embodiment of the present disclosure provides a tactile feedback method applied to the wearable device according to any one embodiment of the present disclosure, the method comprises: receiving the control command; and generating and outputting a coil current corresponding to the electromagnetic coil set to the electromagnetic coil set according to the control command, the electromagnetic coil set is configured to generate tactile feedback based on the coil current.

At least one embodiment of the present disclosure provides a storage medium being used for storing a computer instruction, when the computer instruction is operated by a processor, one or a plurality of steps in the tactile feedback method according to any one embodiment of the present disclosure are executed.

At least one embodiment of the present disclosure provides an electronic device comprising one or a plurality of processors, the processor is configured to operate a computer instruction to execute one or a plurality of steps in the tactile feedback method according to any one embodiment of the present disclosure.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, "on," "under," "left," "right," or the like are only used to indicate relative position relationship, and when the position of the object which is described is changed, the relative position relationship may be changed accordingly.

With the gradual improvement of the virtual reality related technologies, various solutions for improving immersion, such as head attitude tracking based on a six-axis/nine-axis sensor, spatial position tracking in a limited range, gesture recognition and tracking and the like, have been implemented in a virtual reality device. However, in the process of using the virtual reality device, tactility is one missing link, and the existing virtual reality device cannot provide effective tactile feedback so as to influence user experience. Especially in virtual scenes such as grabbing and touching objects, tactility is a very important way of sensing, and the lack of tactility reduces immersion of the user.

At least one embodiment of the present disclosure provides a wearable device, an electronic system and device, a tactile feedback method and a storage medium. Magnetic fields are generated by utilizing electromagnetic coils and each magnetic field interacts with each other so as to generate tactile feedback, and when the wearable device is applied to a virtual reality scene, physical tactility can be improved, so that immersion is improved and user experience is promoted.

The embodiments of the present disclosure do not make any limit to the specific form of the wearable device. For example, the wearable device may include a hand wearable device (e.g., a glove, a watch, a ring, a wrist strap and the like), an arm wearable device (e.g., an armband), a foot wearable device (e.g., a footgear), a leg wearable device (e.g., a knee strap), a head wearable device (e.g., eyeglasses, an earring, a cap and the like), a neck wearable device (e.g., a necklace), a body wearable device (e.g., an intelligent waistband, a schoolbag and the like) and the like.

The embodiments of the present disclosure will be illustrated in detail below with reference to the drawings. It should be noted that same reference signs in different drawings will be used for representing same components that have been described.

At least one embodiment of the present disclosure provides a wearable device with tactile feedback. The wearable device includes a plurality of electromagnetic coils, a driving circuit and a control circuit. The driving circuit is coupled with the plurality of electromagnetic coils. The control circuit is configured to control the driving circuit to generate and output coil currents corresponding to the electromagnetic coils to the plurality of electromagnetic coil according to a control command; and the plurality of electromagnetic coils are configured to receive the coil currents and generate tactile feedback on the basis of the coil currents.

Figure 1:
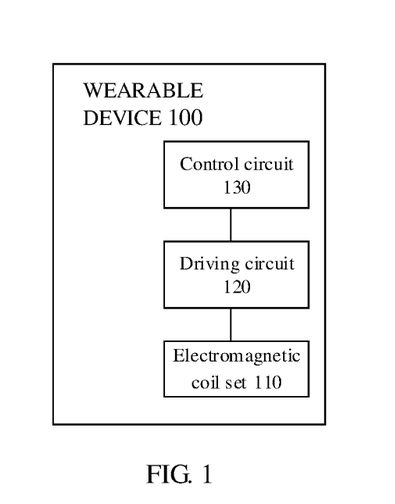
FIG. 1 is a schematic block diagram of a wearable device with tactile feedback, as provided by some embodiments of the present disclosure.

FIG. 1 is a schematic block diagram of a wearable device with tactile feedback, as provided by some embodiments of the present disclosure. With reference to FIG. 1, the wearable device 100 includes an electromagnetic coil set 110, a driving circuit 120 and a control circuit 130. A number of electromagnetic coils in the electromagnetic coil set 110 may be set as required, for example, the number of the electromagnetic coils in the electromagnetic coil set 110 may be six, which is not limited by the embodiments of the present disclosure.

For example, the control circuit 130 and the driving circuit 120 are coupled (e.g., electrically connected), and the driving circuit 120 and the electromagnetic coil set 110 are coupled (e.g., electrically connected).

For example, in some embodiments, the control circuit 130 is configured to control the driving circuit 120 to generate a coil current corresponding to the electromagnetic coil set 110 according to a control command. For example, the control command may be received in a real-time or non-real-time mode from an external device, and may also be pre-stored in the control circuit 130 or other parts of the wearable device 100. Current values and directions of a plurality of coil currents may be the same with each other or different from each other, and may be determined according to actual demands. The driving circuit 120 is further configured to output the coil current to the electromagnetic coil set 110. For example, the driving circuit 120 may include a current output chip or other applicable devices. The electromagnetic coil set 110 is configured to receive the coil current and generate tactile feedback on the basis of the coil current. The electromagnetic coil set 110 may generate a magnetic field after receiving the coil current. For example, in one example, the electromagnetic coil set 110 may include a plurality of electromagnetic coils, the control circuit 130 controls the driving circuit 120 to generate a plurality of coil currents which are in one-to-one correspondence relationship with the plurality of electromagnetic coils in the electromagnetic coil set 110 according to the control command, and the electromagnetic coil set 110 generates a magnetic induction force on the basis of interaction (e.g., mutual repulsion or mutual attraction) between the magnetic fields generated by the coil currents so as to generate tactile feedback for enabling a user to generate tactility when grabbing or touching an object. For example, in another example, the control circuit 130 controls the driving circuit 120 to generate the coil current corresponding to one electromagnetic coil in the electromagnetic coil set 110 according to the control command, and the electromagnetic coil receiving the coil current generates the magnetic field and interacts with a magnetic part additionally arranged to generate the magnetic induction force.

Figure 2A:
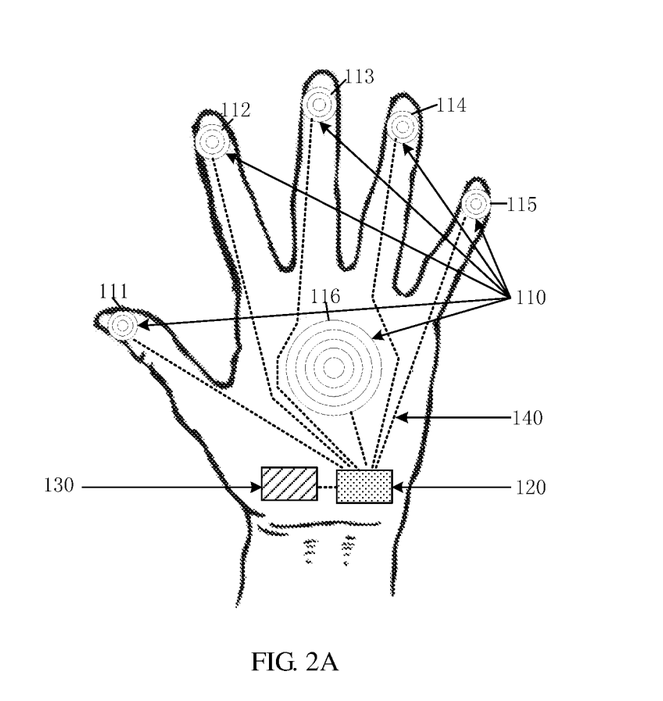
FIG. 2A is a schematic diagram of a wearable device with tactile feedback, as provided by some embodiments of the present disclosure.
Figure 2B:
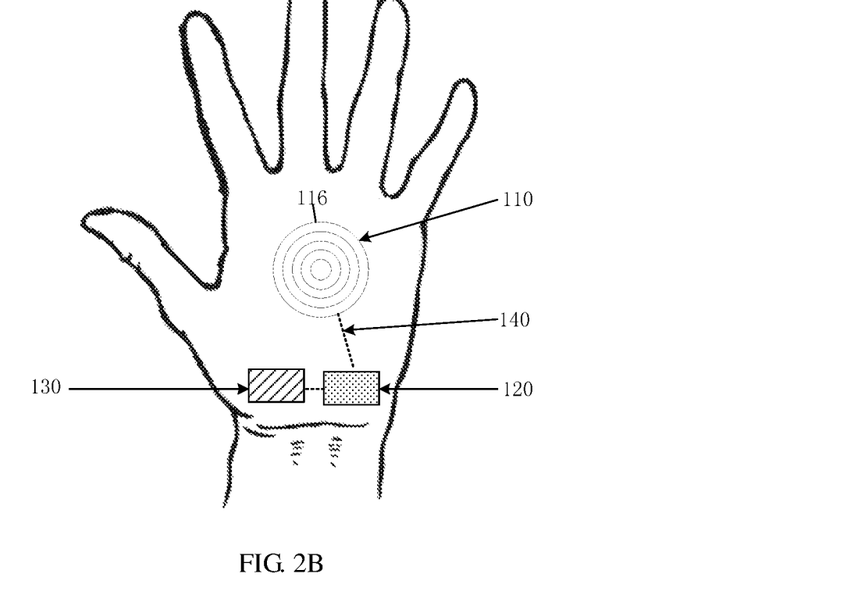
FIG. 2B is a schematic diagram of another wearable device with tactile feedback, as provided by some embodiments of the present disclosure.
Figure 2C:
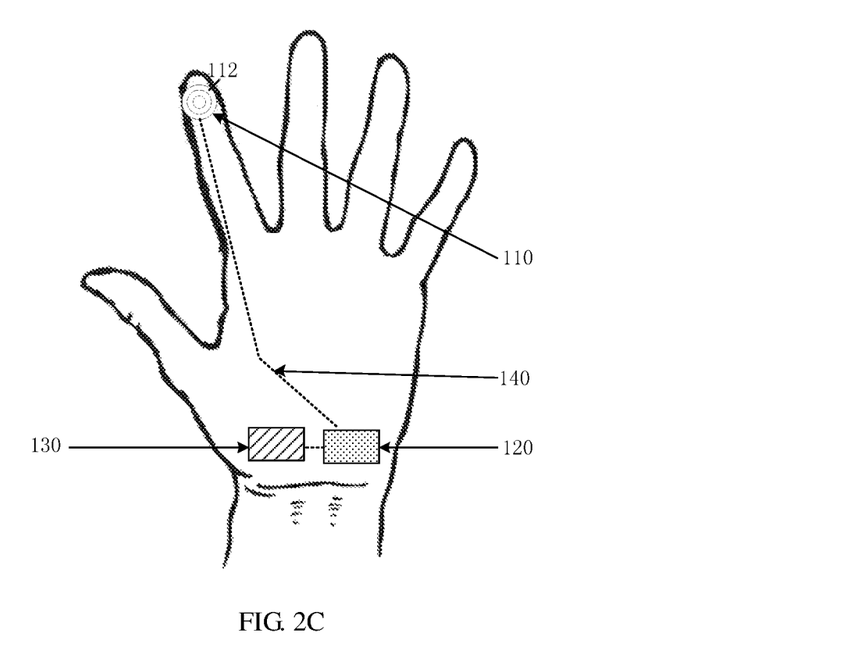
FIG. 2C is a schematic diagram of yet another wearable device with tactile feedback, as provided by some embodiments of the present disclosure.

FIG. 2A is a schematic diagram of a wearable device with tactile feedback, as provided by some embodiments of the present disclosure, FIG. 2B is a schematic diagram of another wearable device with tactile feedback, as provided by some embodiments of the present disclosure, and FIG. 2C is a schematic diagram of yet another wearable device with tactile feedback, as provided by some embodiments of the present disclosure. With reference to FIG. 2A, FIG. 2B and FIG. 2C, the wearable device 100 is a hand wearable device (e.g., a glove). The wearable device 100 includes an electromagnetic coil set 110, a driving circuit 120 and a control circuit 130.

For example, the hand wearable device includes a plurality of finger regions corresponding to finger pulps of fingers of a hand and a palm region corresponding to a middle portion of a palm of the hand. The plurality of finger regions may include a thumb region corresponding to a thumb of the hand, an index finger region corresponding to an index finger of the hand, a middle finger region corresponding to a middle finger of the hand, a ring finger region corresponding to a ring finger of the hand and a little finger region corresponding to a little finger of the hand. The palm region, for example, may represent a region corresponding to a palm center of the palm.

For example, in some embodiments, the electromagnetic coil set 110 merely includes one electromagnetic coil, and the electromagnetic coil is positioned in one of the plurality of finger regions or the palm region. For example, with reference to FIG. 2B, in some examples, the electromagnetic coil set 110 merely includes one sixth electromagnetic coil 116, and the sixth electromagnetic coil 116 is positioned in the palm region; and with reference to FIG. 2C, in some another examples, the electromagnetic coil set 110 merely includes one second electromagnetic coil 112, and the second electromagnetic coil 112 is positioned in one of the plurality of finger regions (e.g., the index finger region).

For example, in some another embodiments, the electromagnetic coil set 110 includes a plurality of electromagnetic coils, and the plurality of electromagnetic coils are respectively positioned in at least two of the plurality of finger regions, or the plurality of electromagnetic coils are respectively positioned in at least one of the plurality of finger regions and the palm region. For example, with reference to FIG. 2A, the electromagnetic coil set 110 includes a first electromagnetic coil 111, a second electromagnetic coil 112, a third electromagnetic coil 113, a fourth electromagnetic coil 114, a fifth electromagnetic coil 115 and a sixth electromagnetic coil 116. For example, all of the electromagnetic coils above are respectively positioned in a plurality of finger regions of the hand wearable device, which correspond to the finger pulps of the fingers, and a palm region of the hand wearable device, which corresponds to a middle position of the palm. With reference to FIG. 2A, the first electromagnetic coil 111 is positioned in the thumb region, the second electromagnetic coil 112 is positioned in the index finger region, the third electromagnetic coil 113 is positioned in the middle finger region, the fourth electromagnetic coil 114 is positioned in the ring finger region, the fifth electromagnetic coil 115 is positioned in the little finger region, and the sixth electromagnetic coil 116 is positioned in the palm region.

It should be noted that in each embodiment of the present disclosure, the number of the electromagnetic coils in the electromagnetic coil set 110 is not limited. For example, in other examples, the electromagnetic coil set 110 may also merely include the first electromagnetic coil 111, the second electromagnetic coil 112, the third electromagnetic coil 113 and the sixth electromagnetic coil 116 so as to provide tactile feedback for the thumb, the index finger and the middle finger, and such mode can simplify the structure and reduce cost when providing tactile feedback. The size of the electromagnetic coil in the electromagnetic coil set 110 is not limited, and may be determined according to a specific structure of the hand wearable device and required tactility intensity. For example, the electromagnetic coil in the electromagnetic coil set 110 may be arranged on the hand wearable device in a random mode such as adhesion, clamping and the like. For example, the electromagnetic coil in the electromagnetic coil set 110 may be formed by spirally winding a wire of which the surface is wrapped with an insulating paint. A winding direction of the electromagnetic coil in the electromagnetic coil set 110 is not limited, and for example, may be clockwise or may also be anticlockwise. A number of turns of the electromagnetic coil in the electromagnetic coil set 110 is not limited, and may be determined according to actual demands.

The embodiments of the present disclosure will be described in detail below by taking a case that the electromagnetic coil set 110 includes a plurality of electromagnetic coils as an example.

The driving circuit 120 is coupled with each electromagnetic coil in the electromagnetic coil set 110. For example, the driving circuit 120 is electrically connected with each electromagnetic coil by an electrical wire 140. The driving circuit 120 is configured to output the coil current to the electromagnetic coil set 110. The number of the driving circuits 120 is not limited. For example, in one example, one driving circuit 120 is provided, and the driving circuit 120 is electrically connected with each electromagnetic coil in the electromagnetic coil set 110. For example, in another example, a plurality of driving circuits 120 are provided, each driving circuit 120 is electrically connected in a one-to-one correspondence mode with each electromagnetic coil in the electromagnetic coil set 110, and each driving circuit 120 is configured to output the coil current to the corresponding electromagnetic coil. Certainly, the embodiments of the present disclosure are not limited thereto, and each driving circuit 120 may also be electrically connected with a portion of the electromagnetic coils in the electromagnetic coil set 110, so that the number of the driving circuits 120 may be flexibly set.

For example, the driving circuit 120 may include a digital circuit or an analog circuit, and may also include a current output chip or other applicable devices. Certainly, the driving circuit 120 may be implemented by adopting a conventional circuit structure, which is not repeated herein. An arrangement position of the driving circuit 120 is not limited, and may be determined according to the specific structure of the hand wearable device.

For example, the driving circuit 120 may include a current generation module and an output module, and for example, the current generation module is configured to receive a control command transmitted by the control circuit 130 and generate a coil current according to the control command, and the output module is configured to output the coil current to the electromagnetic coil set 110. For example, the output module may be a switching element, the control command may include a switching control signal for controlling the switching element, the control circuit 130 may control the switching element to connect or disconnect the current generation module and the electromagnetic coil set 110 according to the switching control signal, and when the current generation module and the electromagnetic coil set 110 are connected, the coil current generated by the current generation module may be transmitted to the electromagnetic coil set 110.

For example, in some examples, the driving circuit 120 may further include a power supply, and the power supply is configured to provide power to the current generation module and the output module.

For example, in some embodiments, the control circuit 130 is electrically connected with the driving circuit 120 by the electrical wire 140. The control circuit 130 is configured to control the driving circuit 120 to generate the coil current corresponding to each electromagnetic coil in the electromagnetic coil set 110 according to the control command. For example, the control circuit 130 may include a Microcontroller Unit (MCU). Certainly, it is not limited thereto, and the control circuit 130 may also include a Field Programmable Gate Array (FPGA), a Complex Programmable Logic Device (CPLD) or other applicable devices. An arrangement position of the control circuit 130 is not limited, and may be determined according to the specific structure of the hand wearable device.

For example, the control circuit 130 adopts a serial or parallel communication protocol to control the driving circuit 120. For example, when the serial communication protocol is adopted, the serial communication protocol may be an Inter-Integrated Circuit (IIC or I2C) protocol, a Serial Peripheral Interface (SPI) protocol or other applicable protocols. By adopting the serial communication protocol, the circuit structure can be simplified, cost can be reduced, and the wearable device has good noise immunity. By adopting the parallel communication protocol, a communication speed can be improved, with high efficiency and good real-time performance.

It should be noted that in each embodiment of the present disclosure, the wearable device 100 may further include more members, such as a force sensor, a distance sensor and the like, so as to provide richer functions, which is not limited by the embodiments of the present disclosure.

For example, the electromagnetic coil set may include a plurality of electromagnetic coils, and coil currents of the plurality of electromagnetic coils are different from each other. For example, the coil currents of at least two electromagnetic coils in the plurality of electromagnetic coils are different in magnitude and direction; or the coil currents of the at least two electromagnetic coils are the same in magnitude and different in direction; or the coil currents of the at least two electromagnetic coils are the same in direction and different in magnitude.

For example, the coil numbers of the plurality of electromagnetic coils may be all the same; or the coil numbers of at least two electromagnetic coils in the plurality of electromagnetic coils may be different.

Figure 3:
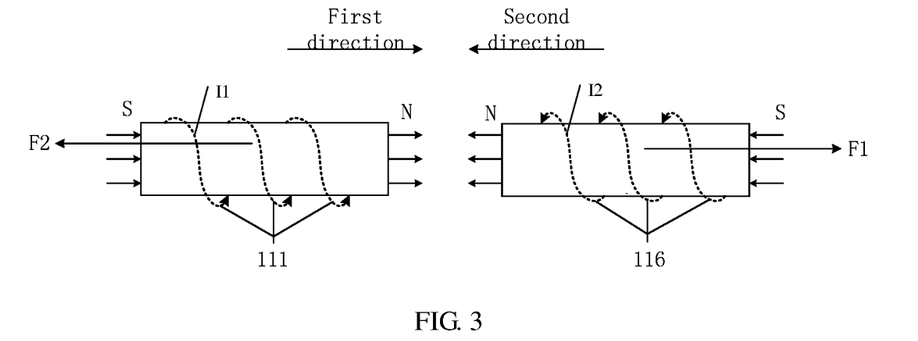
FIG. 3, FIG. 4A and FIG. 4B are schematic diagrams of a principle that electromagnetic coils interact with each other through a magnetic field.
Figure 4A:
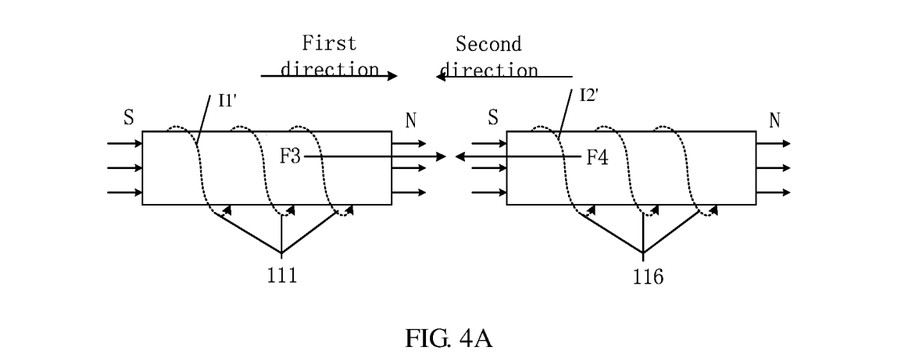
Figure 4B:
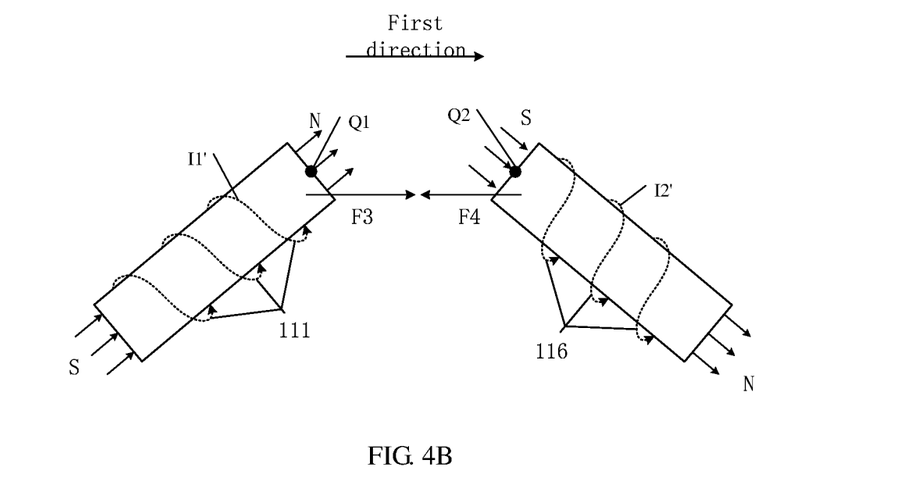

FIG. 3, FIG. 4A and FIG. 4B are schematic diagrams of a principle that electromagnetic coils interact with each other by magnetic fields. The principle that the electromagnetic coils interact with each other by the magnetic fields will be illustrated below in connection with FIG. 3, FIG. 4A and FIG. 4B.

FIG. 3 shows the first electromagnetic coil 111 and the sixth electromagnetic coil 116 in FIG. 2A. For example, the coil number of the first electromagnetic coil 111 and the coil number of the sixth electromagnetic coil 116 may be the same. For example, the first electromagnetic coil 111 and the sixth electromagnetic coil 116 are respectively wound according to a direction as shown in FIG. 3, a first coil current I1 and a second coil current I2 are respectively provided to the first electromagnetic coil 111 and the sixth electromagnetic coil 116, and directions of the first coil current I1 and the second coil current I2 are directions as shown by dotted arrows in FIG. 3. For the first electromagnetic coil 111 and the sixth electromagnetic coil 116, if it is viewed towards a first direction, a current direction of the first coil current I1 is anticlockwise and a current direction of the second coil current I2 is clockwise; and if it is viewed towards a second direction, the current direction of the first coil current I1 is clockwise and the current direction of the second coil current I2 is anticlockwise, i.e., the directions of the first coil current I1 and the second coil current I2 are opposite. According to the Ampere rule (i.e., the right-hand screw rule), it may be known that a magnetic field along the first direction may be generated in the first electromagnetic coil 111, and a magnetic field along the second direction may be generated in the sixth electromagnetic coil 116. For example, the first direction and the second direction are in parallel to each other and opposite in direction. For example, according to a principle that like poles repulse each other and opposite poles attract each other, the north pole N of the magnetic field generated by the first electromagnetic coil 111 and the north pole N of the magnetic field generated by the sixth electromagnetic coil 116 may repulse each other so as to generate a first magnetic induction force F1 and a second magnetic induction force F2, the first magnetic induction force F1 and the second magnetic induction force F2 are one pair of interaction forces, and for example, the first magnetic induction force F1 may be an action force, and a forced direction of the first magnetic induction force F1 may be the first direction; and the second magnetic induction force F2 is a counter action force and a forced direction of the second magnetic induction force F2 may be the second direction. Therefore, a repulsive force is generated by the mutual repulsion of the first electromagnetic coil 111 and the sixth electromagnetic coil 116, and when the repulsive force acts between fingers and a palm, tactile feedback can be generated so as to enable the user to generate tactility.

For another example, when two electromagnetic coils are placed according to the directions as shown in FIG. 3, if it is viewed towards the same direction and if the direction of the current on the first electromagnetic coil 111 and a direction of a current on the third electromagnetic coil 113 are opposite (e.g., if it is viewed towards the same direction, the direction of the current on the first electromagnetic coil 111 is anticlockwise and the direction of the current on the third electromagnetic coil 113 is clockwise), the first electromagnetic coil 111 and the third electromagnetic coil 113 can repulse each other to generate a repulsive force, and the repulsive force acts among a plurality of fingers (e.g., the thumb and the middle finger).

For example, a current value of the first coil current I1 and a current value of the second coil current I2 may be equal. However, the present disclosure is not limited thereto, and the current value of the first coil current I1 and the current value of the second coil current I2 may also be unequal, for example, the current value of the first coil current I1 is greater than the current value of the second coil current I2.

When a first coil current I1' and a second coil current I2' are respectively provided to the first electromagnetic coil 111 and the sixth electromagnetic coil 116 and the first coil current I1' and the second coil current I2' are in directions as shown by dotted arrows in FIG. 4A, for the first electromagnetic coil 111 and the sixth electromagnetic coil 116, if it is viewed towards the first direction, a current direction of the first coil current I1' is anticlockwise, and a current direction of the second coil current I2' is also anticlockwise; and if it is viewed towards the second direction, the current direction of the first coil current I1' is clockwise, and the current direction of the second coil current I2' is also clockwise, i.e., the directions of the first coil current I1' and the second coil current I2' are the same. According to the Ampere rule, it may be known that the magnetic fields along the first direction can be generated in both the first electromagnetic coil 111 and the sixth electromagnetic coil 116. For example, according to the principle that like poles repulse each other and opposite poles attract each other, the north pole N of the magnetic field generated by the first electromagnetic coil 111 and the south pole S of the magnetic field generated by the sixth electromagnetic coil 116 may attract each other so as to generate a third magnetic induction force F3 and a fourth magnetic induction force F4, the third magnetic induction force F3 and the fourth magnetic induction force F4 are one pair of interaction forces, and for example, the third magnetic induction force F3 may be an action force, and a forced direction of the third magnetic induction force F3 may be the second direction; and the fourth magnetic induction force F4 is a counter action force and a forced direction of the fourth magnetic induction force F4 may be the first direction. Therefore, an attractive force is generated by the mutual attraction of the first electromagnetic coil 111 and the sixth electromagnetic coil 116, and when the attractive force acts between the fingers and the palm, tactile feedback can be generated so as to enable the user to generate tactility.

For another example, when two electromagnetic coils are placed according to the directions as shown in FIG. 4A, if it is viewed towards the same direction and if the direction of the current on the first electromagnetic coil 111 and the direction of the current on the third electromagnetic coil 113 are the same (e.g., if it is viewed towards the same direction, the direction of the current on the first electromagnetic coil 111 is anticlockwise and the direction of the current on the third electromagnetic coil 113 is anticlockwise), the first electromagnetic coil 111 and the third electromagnetic coil 113 may attract each other to generate an attractive force, and the attractive force acts among a plurality of fingers (e.g., the thumb and the middle finger).

It should be noted that the directions of the magnetic fields respectively generated by the first electromagnetic coil 111 and the sixth electromagnetic coil 116 may be in parallel to each other, and may also have an included angle. For example, in one example, as shown in FIG. 4B, when the directions of the magnetic fields respectively generated by the first electromagnetic coil 111 and the sixth electromagnetic coil 116 have the included angle, mutual repulsion or mutual attraction may still be generated between the first electromagnetic coil 111 and the sixth electromagnetic coil 116, and at the moment, the forced directions are in parallel to a direction (e.g., the first direction as shown in FIG. 4B) of a connection line between a midpoint (e.g., a Q1 point as shown in FIG. 4B) of an end portion of the first electromagnetic coil 111 and a midpoint (e.g., a Q2 point as shown in FIG. 4B) of an end portion of the sixth electromagnetic coil 116.

For example, the control command includes at least one of the direction and the current value of each coil current, increasing the current values of a portion or all of the coil currents, decreasing the current values of a portion or all of the coil currents, re-providing a portion or all of the coil currents and turning-off a portion or all of the coil currents. Certainly, it is not limited thereto, and the control command may further include other applicable contents so as to adapt to diversified virtual reality scenes.

Figure 5:
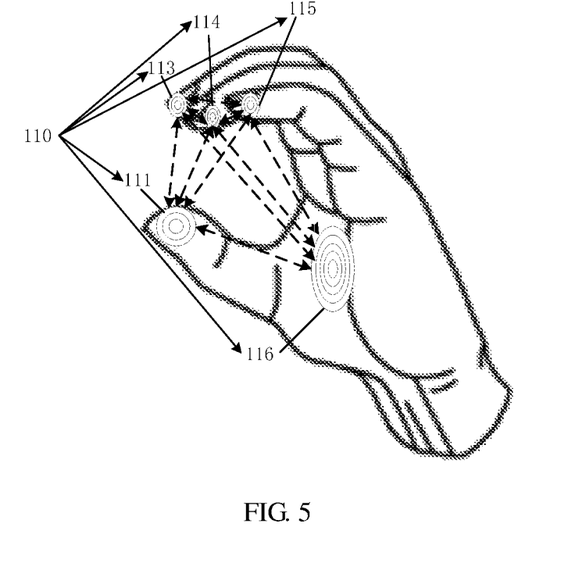
FIG. 5 is a schematic diagram of a tactility generation principle of a wearable device with tactile feedback, as provided by some embodiments of the present disclosure.

FIG. 5 is a schematic diagram of a tactility generation principle of a wearable device with tactile feedback, as provided by some embodiments of the present disclosure. With reference to FIG. 5, when a user makes a gesture of grabbing or touching an object, mutual repulsion needs to be implemented between fingers and between the fingers and a palm, and at the moment, a control command may include current values and directions of coil currents of a plurality of electromagnetic coils (e.g., a first electromagnetic coil 111, a third electromagnetic coil 113, a fourth electromagnetic coil 114, a fifth electromagnetic coil 115 and a sixth electromagnetic coil 116), and for example, the current values of the coil current of the plurality of electromagnetic coils may be the same and in a direction perpendicular to a palm center of the palm, i.e., if it is viewed towards the direction of the palm center of the palm, the directions of the coil currents of the plurality of electromagnetic coils may be the same and for example, are all clockwise. A control circuit 130 may control, for example, a current generation module in a driving circuit 120 to generate the coil currents corresponding to the plurality of electromagnetic coils in an electromagnetic coil set 110 according to the control command and respectively output the corresponding coil currents to the plurality of electromagnetic coils in the electromagnetic coil set 110, so that the plurality of electromagnetic coils generate a plurality of magnetic fields under the action of the coil currents, i.e., a plurality of magnetic fields are generated at different positions of a hand. The plurality of magnetic fields interact with each other. When any two of the plurality of electromagnetic coils are close to each other, the two electromagnetic coils can repulse each other. For example, the first electromagnetic coil 111, the third electromagnetic coil 113, the fourth electromagnetic coil 114 and the fifth electromagnetic coil 115 respectively repulse the sixth electromagnetic coil 116, so that the fingers and the palm of the user are applied with a repulsive force to generate repulsive tactile feedback, thereby enabling the user to generate tactility.

For another example, when mutual attraction needs to be implemented between the fingers and the palm, at the moment, the control command may include current values and directions of coil currents of a plurality of electromagnetic coils (e.g., the first electromagnetic coil 111, the third electromagnetic coil 113, the fourth electromagnetic coil 114, the fifth electromagnetic coil 115 and the sixth electromagnetic coil 116), and for example, the current values of the coil currents of the plurality of electromagnetic coils may be the same and in the direction perpendicular to the palm center of the palm, i.e., if it is viewed towards the direction of the palm center of the palm, the directions of the coil currents of the first electromagnetic coil 111, the third electromagnetic coil 113, the fourth electromagnetic coil 114 and the fifth electromagnetic coil 115 may be the same and for example, are all clockwise, and the direction of the coil current of the sixth electromagnetic coil 116 may be opposite to that of the coil current of the first electromagnetic coil 111 and for example, the direction of the coil current of the sixth electromagnetic coil 116 is anticlockwise. The control circuit 130 may control, for example, the current generation module in the driving circuit 120 to generate the coil currents corresponding to the plurality of electromagnetic coils in the electromagnetic coil set 110 according to the control command and respectively output the corresponding coil currents to the plurality of electromagnetic coils in the electromagnetic coil set 110, so that the plurality of electromagnetic coils generate a plurality of magnetic fields under the action of the coil currents, i.e., a plurality of magnetic fields are generated at different positions of the hand. When any one of the first electromagnetic coil 111, the third electromagnetic coil 113, the fourth electromagnetic coil 114 and the fifth electromagnetic coil 115 is close to the sixth electromagnetic coil 116, the electromagnetic coil and the sixth electromagnetic coil 116 may attract each other, so that the fingers and the palm of the user are applied with an attractive force to generate attractive tactile feedback, thereby enabling the user to generate tactility.

It should be noted that in each embodiment of the present disclosure, interaction among a plurality of electromagnetic coils in the electromagnetic coil set 110 may be mutual repulsion and may also be mutual attraction, or one part of coils repulse each other and the other part of coils attract each other, the embodiments of the present disclosure do not make any limit thereto, and it may be determined according to a specific application scene.

For example, tactile feedback generated by interaction among the plurality of magnetic fields may include: feedback of the repulsive force generated according to mutual repulsion of the plurality of magnetic fields, feedback of the attractive force generated according to mutual attraction of the plurality of magnetic fields, or feedback of combination of the repulsive force generated according to mutual repulsion of one part of magnetic fields in the plurality of magnetic fields and the attractive force generated according to mutual attraction of the other part of magnetic fields in the plurality of magnetic fields.

For example, the directions and the current values of the coil currents respectively provided to the plurality of electromagnetic coils in the electromagnetic coil set 110 may be the same with each other, and may also be different from each other. The directions and the current values of the coil currents respectively provided to the plurality of electromagnetic coils in the electromagnetic coil set 110 may be determined according to a specific gesture (a relative position relationship of the plurality of electromagnetic coils in the electromagnetic coil set 110), an application scene and an arrangement mode of the plurality of electromagnetic coils in the electromagnetic coil set 110.

For example, in one example, when the wearable device 100 is applied in a virtual reality scene, a virtual reality device captures a gesture of the user and generates the control command according to the gesture and the specific virtual scene. The wearable device 100 receives the control command, the control circuit 130 controls the driving circuit 120 to output a plurality of coil currents corresponding to the electromagnetic coil set 110 one to one to the electromagnetic coil set 110 according to the control command A plurality of electromagnetic coils in the electromagnetic coil set 110 generate a plurality of magnetic fields on the basis of the plurality of coil currents, and the plurality of magnetic fields interact with each other so as to generate tactile feedback. Such mode can implement real-time feedback, making the user's feeling more authentic, helping to improve the user's immersion in the virtual reality scene and improving the user experience.

For example, in another example, when the wearable device 100 is applied to a virtual reality scene, the control command is pre-stored in the control circuit 130 or other members of the wearable device 100. For example, the control command may be determined according to required time and mode of generating tactile feedback in the virtual reality scene. The control circuit 130 controls the driving circuit 120 to output the coil current to the electromagnetic coil set 110 in a preset mode in preset time according to the pre-stored control command, so that each electromagnetic coil in the electromagnetic coil set 110 interacts with each other to generate tactile feedback. Such mode can reduce the number of the members, simplify the device structure and reduce production cost.

Figure 6:
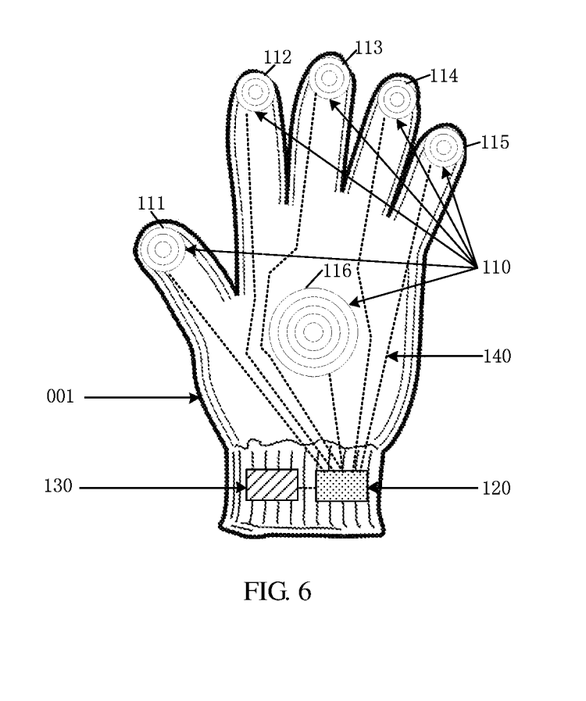
FIG. 6 is a schematic diagram of a wearable device with tactile feedback, as provided by some embodiments of the present disclosure.

FIG. 6 is a schematic diagram of a wearable device with tactile feedback, as provided by some embodiments of the present disclosure. With reference to FIG. 6, the wearable device 100 includes a glove 001, and an electromagnetic coil set 110, a driving circuit 120 and a control circuit 130 are all integrated on the glove 001. For example, first to fifth electromagnetic coils 111 to 115 are integrated at positions on the glove 001, which correspond to finger pulps of fingers, and a sixth electromagnetic coil 116 is integrated at a position on the glove 001, which corresponds to the middle of a palm (e.g., a palm center of the palm). For example, the driving circuit 120 and the control circuit 130 are integrated at positions on the glove 001, which correspond to a wrist. For example, an electrical wire 140 is also integrated on the glove 001 so as to implement electrical connection among the members.

For example, each part may be integrated on the glove 001 in a random applicable mode, such as adhesion, sewing and the like. It should be noted that in each embodiment of the present disclosure, the arrangement position of each member on the glove 001 is not limited and may be determined according to actual demands. For example, in other examples, the driving circuit 120 and the control circuit 130 may be integrated at positions on the glove 001, which correspond to a back of the hand, so as to make full use of space and reduce a size of the glove 001.

For example, the glove 001 is used as a carrier of each member, which can provide sufficient support and is convenient for the user to wear and convenient to use. Certainly, the embodiments of the present disclosure are not limited thereto, and the wearable device 100 may be a device in a random form, as long as the wearable device 100 can be worn on the hand. For example, in other examples, the wearable device 100 is specifically implemented in a form of six ring-shaped sleeves, five of the ring-shaped sleeves may be worn on five fingers, the other one ring-shaped sleeve may be worn on the palm, and six ring-shaped sleeves are matched with each other to work so as to implement tactile feedback.

Figure 7:
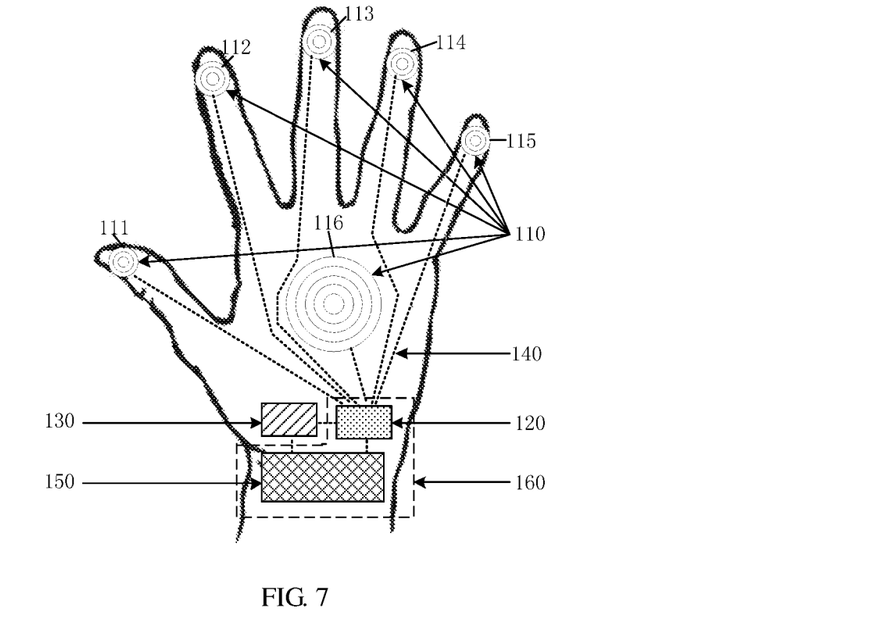
FIG. 7 is a schematic diagram of another wearable device with tactile feedback, as provided by some embodiments of the present disclosure.

FIG. 7 is a schematic diagram of another wearable device with tactile feedback, as provided by some embodiments of the present disclosure. With reference to FIG. 7, except that the wearable device 100 further includes a power supply 150, the wearable device 100 in this embodiment is similar with the wearable device 100 described in FIG. 2, and the same contents are not repeated herein. In this embodiment, the wearable device 100 further includes the power supply 150. The power supply 150 is configured to provide electric energy to devices, such as the driving circuit 120, the control circuit and the like, in the wearable device 100.

For example, the power supply 150 is coupled with (e.g., electrically connected with) the driving circuit 120 and the control circuit 130 so as to provide electric energy. An arrangement position of the power supply 150 is not limited, and may be determined according to the specific structure of the wearable device 100.

For example, the power supply 150 may be a battery or a power adapter. For example, the power supply 150 may be a rechargeable battery, and may also be a disposable battery (a primary battery). For example, when the power supply 150 is the disposable battery, the power supply 150 may be installed in a detachable mode so as to facilitate replacement when the electricity quantity runs out. For example, the power supply 150 may be a flexible battery, and the flexible battery may be bent along with the change of a gesture of a user, so that the arrangement position of the power supply 150 is not influenced by the gesture of the user and the user experience can be improved. For example, in one example, the power supply 150 and the driving circuit 120 are integrated into one whole body, i.e., are integrated into a current output module 160, and the current output module 160 may be a special or universal module or circuit. Such mode can reduce the number of the members and improve the integration level of the device.

It should be noted that in each embodiment of the present disclosure, a power supply mode of the wearable device 100 is not limited, and the wearable device 100 may be supplied with power by the power supply 150, and may also be supplied with power by other applicable members.

Figure 8:
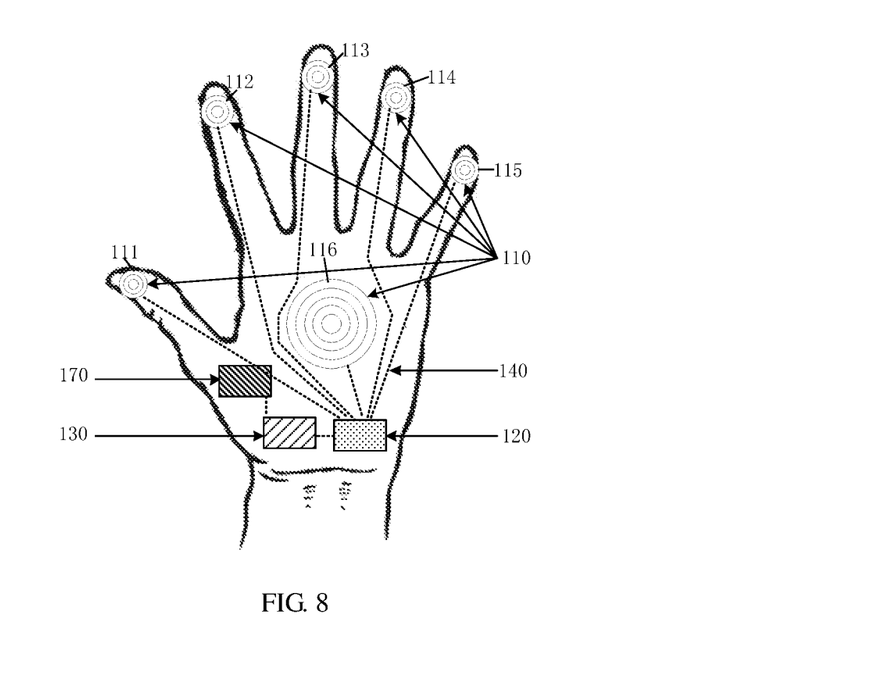
FIG. 8 is a schematic diagram of yet another wearable device with tactile feedback, as provided by some embodiments of the present disclosure.

FIG. 8 is a schematic diagram of yet another wearable device with tactile feedback, as provided by some embodiments of the present disclosure. With reference to FIG. 8, except that the wearable device 100 further includes a first communication module 170, the wearable device 100 in this embodiment is similar with the wearable device 100 described in FIG. 2, and the repeated portions are not described herein again. In this embodiment, the wearable device 100 further includes the first communication module 170. The first communication module 170 is electrically connected with the control circuit 130. The first communication module 170 is configured to communicate with a command device, receive the control command from the command device and send the control command to the control circuit 130. For example, the command device may be a random external device which may send the control command to the wearable device 100.

For example, the first communication module 170 may be a wireless communication module so as to reduce connection cables between the wearable device 100 and other external devices and improve convenience in use. More specifically, for example, the first communication module 170 may be a Bluetooth Low Energy (BLE) module, so that power consumption is reduced and a speed of connecting with the device sending the control command can be improved. Certainly, it is not limited thereto, and the first communication module 170 may also be a random applicable communication module, such as an infrared communication module, a ZigBee module and the like.

It should be noted that in each embodiment of the present disclosure, the first communication module 170 may be the wireless communication module and may also be a wired communication module, and the embodiments of the present disclosure do not make any limit thereto. For example, in other examples, the first communication module 170 may be the wired communication module, e.g., a serial/parallel communication module, an optical transceiver and the like, and such mode can improve security of a transmission signal and is convenient for matching with diversified external devices.

At least one embodiment of the present disclosure further provides an electronic system, and the electronic system includes a command device and the wearable device according to any one of the embodiments of the present disclosure. The command device is configured to generate the control command and send the control command to the wearable device. The electronic system can provide tactile feedback, and when the electronic system is applied to a virtual reality scene, physical tactility can be improved, so that immersion is improved, and user experience is promoted.

Figure 9:
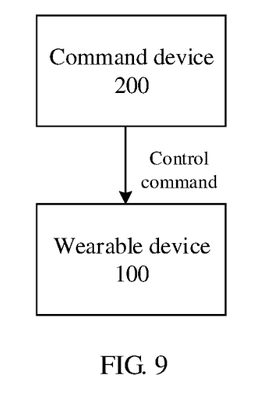
FIG. 9 is a schematic block diagram of an electronic system provided by some embodiments of the present disclosure.

FIG. 9 is a schematic block diagram of an electronic system provided by some embodiments of the present disclosure. With reference to FIG. 9, the electronic system includes a wearable device 100 and a command device 200. The wearable device 100 is the wearable device 100 according to any one of the embodiments of the present disclosure. The command device 200 is configured to generate the control command and send the control command to the wearable device 100. The command device 200 may send the control command in a wired or wireless mode. For example, the command device 200 may also be configured to receive feedback information from the wearable device 100 so as to acquire information such as state parameters of the wearable device 100 and the like.

For example, the command device 200 may be a separate device, and may also be integrated with other devices into one whole body. For example, in one example, the electronic system is applied to the virtual reality scene, and the command device 200 may be integrated with a virtual reality device into one whole body so as to improve the integration level of an entire application system. For example, the command device 200 may be an electronic computer or a random applicable device, or may also be software or an executable program integrated into other devices, which is not limited by the embodiments of the present disclosure.

Figure 10:
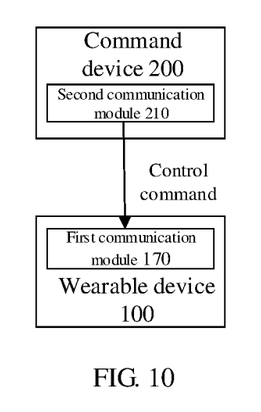
FIG. 10 is a schematic block diagram of another electronic system provided by some embodiments of the present disclosure.

FIG. 10 is a schematic block diagram of another electronic system provided by some embodiments of the present disclosure. With reference to FIG. 10, a command device 200 includes a second communication module 210. The second communication module 210 is configured to communicate with the first communication module 170 in the wearable device 100 so as to transmit a control command.

For example, when the first communication module 170 is the BLE module, the second communication module 210 may also be a BLE module so as to implement mutual communication. Certainly, the embodiments of the present disclosure are not limited thereto, and the second communication module 210 may be a module adopting a random communication protocol or communication mode, as long as communication with the first communication module 170 can be implemented.

At least one embodiment of the present disclosure further provides a tactile feedback method applied to the wearable device according to any one of the embodiments of the present disclosure. The tactile feedback method includes: receiving the control command; and generating and outputting a coil current corresponding to the electromagnetic coil set to the electromagnetic coil set according to the control command. The electromagnetic coil set is configured to generate tactile feedback on the basis of the coil current. By utilizing the tactile feedback method, tactile feedback can be provided, and physical tactility can be improved, so that immersion is improved and user experience is promoted.

Figure 11:
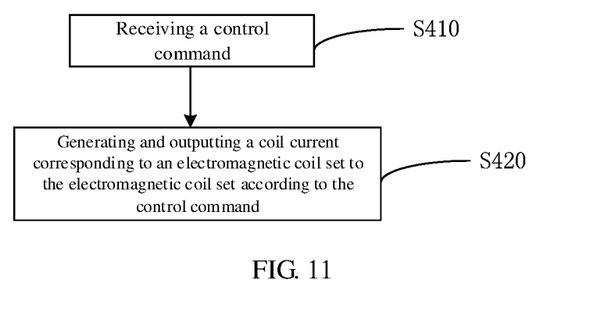
FIG. 11 is a flow chart of a tactile feedback method applied to a wearable device, as provided by some embodiments of the present disclosure.

FIG. 11 is a flow chart of a tactile feedback method applied to a wearable device, as provided by some embodiments of the present disclosure. With reference to FIG. 11, the tactile feedback method includes steps:

S410: receiving a control command; and

S420: generating and outputting a coil current corresponding to an electromagnetic coil set to the electromagnetic coil set according to the control command.

For example, the electromagnetic coil set is configured to generate tactile feedback on the basis of the coil current.

For example, the electromagnetic coil set may include a plurality of electromagnetic coils, and current values and directions of coil currents of the plurality of electromagnetic coils may be the same; or, the coil currents of at least two electromagnetic coils in the plurality of electromagnetic coils are different in magnitude and direction; the coil currents of the at least two electromagnetic coils in the plurality of electromagnetic coils are the same in magnitude and different in direction; or the coil currents of the at least two electromagnetic coils in the plurality of electromagnetic coils are the same in direction and different in magnitude.

It should be noted that in each embodiment of the present disclosure, at least part of steps of the tactile feedback method may be implemented in a mode of software, hardware, firmware or a random combination thereof. Similarly, flow of the tactile feedback method may include more or fewer operations, and those operations may be sequentially executed or executed in parallel. The flow of the tactile feedback method described above includes a plurality of operations emerging according to a specific sequence, but it should be known clearly that the sequence of the plurality of operations is not limited. The detailed description related to the tactile feedback method may refer to the description on the working principle of the wearable device 100 in the embodiments of the present disclosure, and is not repeated herein.

At least one embodiment of the present disclosure further provides a storage medium for storing a computer instruction, wherein when the computer instruction is operated by a processor, one or a plurality of steps in the tactile feedback method according to any one of the embodiments of the present disclosure may be executed.

For example, the storage medium may be a computer readable storage medium in various forms, and the computer instruction may be a non-transitory computer readable instruction.

For example, the computer instruction is stored in a non-transitory mode in the storage medium. When the storage medium is read by a computer, the computer can execute the computer instruction stored in the storage medium so as to execute one or a plurality of steps in the tactile feedback method provided by any one of the embodiments of the present disclosure. In each embodiment of the present disclosure, the storage medium is not limited, may be a compact disc, a floppy disk, a hard disk, a flash memory, a U disk, a Compact Flash (CF) card, a Secure Digital (SD) card, a Multi Media Card (MMC), a Smart Media (SM) card, a memory stick, an xD card and the like, and may also be other applicable storage media.

At least one embodiment of the present disclosure further provides an electronic device, including one or a plurality of processors. The processor is configured to operate a computer instruction to execute one or a plurality of steps in the tactile feedback method according to any one of the embodiments of the present disclosure.

For example, the electronic device may be any applicable devices, such as, a computer.

The following statements should be noted:

(1) The accompanying drawings involve only the structure(s) in connection with the embodiment(s) of the present disclosure, and other structure(s) can be referred to common design(s).

(2) In case of no conflict, features in one embodiment or in different embodiments can be combined to obtain a new embodiment.

What are described above is related to the specific embodiments of the disclosure only and not limitative to the scope of the disclosure. The protection scope of the disclosure shall be based on the protection scope of the claims.

The invention claimed is:

1. A wearable device with tactile feedback, comprising: an electromagnetic coil set, a driving circuit and a control circuit,
wherein the driving circuit is coupled with the electromagnetic coil set;
the control circuit is configured to control the driving circuit to generate and output a coil current corresponding to the electromagnetic coil set to the electromagnetic coil set according to a control command; and
the electromagnetic coil set is configured to receive the coil current and generate the tactile feedback based on the coil current,
wherein the electromagnetic coil set includes a plurality of electromagnetic coils, and the coil currents of the plurality of electromagnetic coils are different from each other,
the electromagnetic coil set is configured to generate a plurality of magnetic fields under the action of the coil currents, each of the plurality of electromagnetic coils is configured to generate a magnetic field under the action of the coil currents, the plurality of electromagnetic coils is configured to generate the plurality of magnetic fields,
the tactile feedback includes feedback of a repulsive force generated according to mutual repulsion of the plurality of magnetic fields generated by the plurality of electromagnetic coils, feedback of an attractive force generated according to mutual attraction of the plurality of magnetic fields generated by the plurality of electromagnetic coils, or feedback of combination of the repulsive force generated according to mutual repulsion of one portion of the plurality of magnetic fields generated by the plurality of electromagnetic coils and the attractive force generated according to mutual attraction of another portion of the plurality of magnetic fields generated by the plurality of electromagnetic coils,
the plurality of electromagnetic coils respectively correspond to different regions of a human body, the tactile feedback is generated by a mutual attraction or a mutual repulsion between the magnetic fields of the electromagnetic coils positioned at the difference regions of the human body,
the electromagnetic coil set comprises a first electromagnetic coil and a sixth electromagnetic coil, a first coil current I1 and a second coil current I2 are respectively provided to the first electromagnetic coil and the sixth electromagnetic coil, directions of the first coil current I1 and the second coil current I2 are opposite, and when it is viewed towards a first direction, a current direction of the first coil current I1 is anticlockwise and a current direction of the second coil current I2 is clockwise, and it is viewed towards a second direction, the current direction of the first coil current I1 is clockwise and the current direction of the second coil current I2 is anticlockwise, a magnetic field along the first direction is generated in the first electromagnetic coil, and a magnetic field along the second direction is generated in the sixth electromagnetic coil, and the first direction and the second direction are in parallel to each other and opposite in direction, a north pole N of the magnetic field generated by the first electromagnetic coil and a north pole N of the magnetic field generated by the sixth electromagnetic coil repulse each other, a repulsive force which acts between fingers and a palm is generated by a mutual repulsion of the first electromagnetic coil and the sixth electromagnetic coil, tactile feedback is generated so as to enable the user to generate tactility.

2. The wearable device according to claim 1, wherein the coil currents of at least two electromagnetic coils in the plurality of electromagnetic coils are different in magnitude and direction; or
the coil currents of the at least two electromagnetic coils are identical in magnitude and different in direction.

3. The wearable device according to claim 2, wherein the control command includes at least one of a direction and a current value of the coil current, increasing the current values of a portion or all of the coil currents, decreasing the current values of a portion or all of the coil currents, re-providing a portion or all of the coil currents and turning-off a portion or all of the coil currents.

4. The wearable device according to claim 1, wherein the wearable device is a hand wearable device, the hand wearable device includes a plurality of finger regions corresponding to finger pulps of fingers of a hand and a palm region corresponding to a middle position of a palm of the hand,
the electromagnetic coil set includes a plurality of electromagnetic coils, and the plurality of electromagnetic coils are respectively positioned in at least two of the plurality of finger regions, or the plurality of electromagnetic coils are respectively positioned in at least one of the plurality of finger regions and the palm region.

5. The wearable device according to claim 1, wherein the control command includes at least one of a direction and a current value of the coil current, increasing the current values of a portion or all of the coil currents, decreasing the current values of a portion or all of the coil currents, re-providing a portion or all of the coil currents and turning-off a portion or all of the coil currents.

6. The wearable device according to claim 1, further comprising a power supply,
wherein the driving circuit and the control circuit are coupled with the power supply, and the power supply is configured to supply electric energy to the driving circuit and the control circuit.

7. The wearable device according to claim 6, wherein the power supply includes a flexible battery.

8. The wearable device according to claim 6, wherein the power supply and the driving circuit are integrated into one whole body.

9. The wearable device according to claim 1, further comprising a first communication module,
wherein the first communication module is configured to communicate with a command device, receive the control command from the command device and send the control command to the control circuit.

10. An electronic system, comprising a command device and the wearable device according to claim 1,
wherein the command device is configured to generate the control command and send the control command to the wearable device.

11. The electronic system according to claim 10, wherein the command device includes a second communication module, and the second communication module is configured to communicate with the wearable device.

12. The electronic system according to claim 11, wherein the wearable device includes a first communication module, and the second communication module is configured to communicate with the first communication module.

13. A tactile feedback method applied to the wearable device according to claim 1, comprising:

receiving the control command; and generating and outputting a coil current corresponding to the electromagnetic coil set to the electromagnetic coil set according to the control command, wherein the electromagnetic coil set is configured to generate tactile feedback based on the coil current.

14. A non-transitory storage medium, being used for storing a computer instruction, wherein when the computer instruction is operated by a processor, one or a plurality of steps in the tactile feedback method according to claim 13 are executed.

15. An electronic device, comprising one or a plurality of processors, the processor being configured to operate a computer instruction to execute one or a plurality of steps in the tactile feedback method according to claim 13.

16. The wearable device according to claim 1, wherein the control command includes at least one of a direction and a current value of the coil current, increasing the current values of a portion or all of the coil currents, decreasing the current values of a portion or all of the coil currents, re-providing a portion or all of the coil currents and turning-off a portion or all of the coil currents.

17. The wearable device according to claim 1, wherein the electromagnetic coil set comprises further comprises the third electromagnetic coil, the fourth electromagnetic coil and the fifth electromagnetic coil, current directions of the third electromagnetic coil, the fourth electromagnetic coil and the fifth electromagnetic coil are a same as the current direction of the first electromagnetic coil, the first electromagnetic coil, the third electromagnetic coil, the fourth electromagnetic coil and the fifth electromagnetic coil respectively repulse the sixth electromagnetic coil, so that the fingers and the palm of the user are applied with a repulsive force to generate repulsive tactile feedback, enabling the user to generate tactility.

* * * * *